United States Patent
Nakata

(10) Patent No.: US 6,829,886 B2
(45) Date of Patent: Dec. 14, 2004

(54) EMISSION CONTROL APPARATUS OF INTERNAL COMBUSTION ENGINE, AND METHOD FOR RETARDING DETERIORATION OF EMISSION CONTROL CATALYST

(75) Inventor: Kunihiko Nakata, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 19 days.

(21) Appl. No.: 10/115,955

(22) Filed: Apr. 5, 2002

(65) Prior Publication Data

US 2002/0144500 A1 Oct. 10, 2002

(30) Foreign Application Priority Data

Apr. 10, 2001 (JP) ........................................ 2001-111544
Jan. 16, 2002 (JP) ........................................ 2002-007700

(51) Int. Cl.[7] .............................................. F01N 3/00
(52) U.S. Cl. ............................ 60/277; 60/274; 60/289; 60/290; 123/481
(58) Field of Search ........................ 60/274, 277, 285, 60/289, 290; 123/198 F, 481; 701/83, 86, 91

(56) References Cited

U.S. PATENT DOCUMENTS

| | | | | |
|---|---|---|---|---|
| 3,955,363 A | * | 5/1976 | Manderscheid | 60/277 |
| 3,967,929 A | * | 7/1976 | Tamazawa et al. | 60/289 |
| 4,376,369 A | | 3/1983 | Horikoshi et al. | |
| 5,025,881 A | * | 6/1991 | Poirier et al. | 123/481 |
| 5,463,551 A | * | 10/1995 | Milunas | 60/285 |
| 5,473,544 A | * | 12/1995 | Yamashita | 701/86 |
| 5,630,480 A | * | 5/1997 | Nishikata | 701/86 |
| 5,884,603 A | * | 3/1999 | Matsuki | 123/198 F |
| 6,161,377 A | | 12/2000 | Boegner et al. | |
| 6,389,807 B1 | * | 5/2002 | Suzuki et al. | 60/274 |
| 6,510,685 B2 | * | 1/2003 | Bolz et al. | 60/285 |

FOREIGN PATENT DOCUMENTS

| | | |
|---|---|---|
| DE | 197 47 222 C1 | 10/1997 |
| JP | A 54-55223 | 5/1979 |
| JP | A 59-96423 | 6/1984 |
| JP | A 61-58912 | 3/1986 |
| JP | 4-171231 | * 6/1992 |
| JP | A-8-296430 | 11/1996 |
| JP | A 9-88563 | 3/1997 |

* cited by examiner

Primary Examiner—Tu M. Nguyen
(74) Attorney, Agent, or Firm—Oliff & Berridge, PLC

(57) ABSTRACT

In an emission control apparatus of an internal combustion engine in which an emission control catalyst is disposed in an engine exhaust passage, if fuel cut is performed during a decelerating operation of the engine when the temperature of the emission control catalyst is to be quickly reduced by a secondary air supply device supplying fresh air to the emission control catalyst during the decelerating operation of the engine, the supply of fresh air from the secondary air supply device to the emission control catalyst is started after a fuel cut executing condition is met but before the fuel cut is actually executed. Therefore, the temperature of the catalyst is reduced before the exhaust air-fuel ratio shifts to the lean side due to execution of the fuel cut. Thus, exposure of the catalyst to a deteriorating condition of high temperature and lean air-fuel ratio is prevented.

8 Claims, 14 Drawing Sheets

EMISSION CONTROL APPARATUS OF INTERNAL COMBUSTION ENGINE, AND METHOD FOR RETARDING DETERIORATION OF EMISSION CONTROL CATALYST

INCORPORATION BY REFERENCE

The disclosures of Japanese Patent Applications Nos. 2001-111544 filed on Apr. 10, 2001 and 2002-7700 filed on Jan. 16, 2002, each including the specification, drawings and abstract, are incorporated herein by reference in their entireties.

BACKGROUND OF THE INVENTION

1. Field of Invention

The invention relates to an emission control apparatus of an internal combustion engine, and a method for retarding deterioration of an emission control catalyst.

2. Description of Related Art

Among the internal combustion engine emission control apparatuses in which an emission control catalyst is disposed in an engine exhaust passage, there are known internal combustion engine emission control apparatuses that retard the deterioration of an emission control catalyst by preventing excessively high temperatures of the emission control catalyst. An example of this type of internal combustion engine emission control apparatuses is described in Japanese Patent Application Laid-Open No. 9-88563. According to the internal combustion engine emission control apparatus described in Japanese Patent Application Laid-Open No. 9-88563, if the temperature of the emission control catalyst becomes high, relatively low-temperature exhaust gas is supplied to the emission control catalyst, so that the temperature of the emission control catalyst will drop.

The internal combustion engine emission control apparatus described in the patent application reduces the temperature of the emission control catalyst by supplying relatively low-temperature exhaust gas to the emission control catalyst when the temperature of the catalyst is high. However, this laid-open patent application does not disclose at what timing the exhaust gas should be supplied to the emission control catalyst to increase the reducing rate of the temperature of the emission control catalyst. Therefore, the internal combustion engine emission control apparatus described in Japanese Patent Application Laid-Open No. 9-88563 is not able to quickly reduce the temperature of the emission control catalyst. Furthermore, the internal combustion engine emission control apparatus described in this patent application performs reflux of exhaust gas during a high-speed and high-load operation, that is, during an operation region with a high pressure in the exhaust system. Therefore, a pump for supplying exhaust gas needs to have a high capacity.

Japanese Patent Application Laid-Open Nos. 54-55223 and 59-96423 describe internal combustion engine emission control apparatuses in which if the temperature of an emission control catalyst becomes high, the temperature of the catalyst is reduced by supplying secondary air to the catalyst during a decelerating engine operation, to retard the deterioration of the catalyst. In the emission control apparatuses described in these patent applications, a fixed amount of fresh air is supplied to the catalyst regardless of the catalyst temperature. Therefore, there are various problems such as, for example, a failure in sufficiently reducing the catalyst temperature, the excessive cooling of the catalyst caused by the supply of secondary air, degraded fuel economy caused by increased power consumption of a secondary air pump, etc. Further, the internal combustion engine emission control apparatuses supply secondary air to the emission control catalyst regardless of the air-fuel ratio of the atmosphere of the catalyst whenever the temperature of the catalyst is high. Therefore, the supply of secondary air may cause a high catalyst temperature and a lean air-fuel ratio atmosphere. In reality, however, the deterioration of the emission control catalyst is considerably related to the atmospheric air-fuel ratio. For example, if the temperature is high and the atmospheric air-fuel ratio is high (lean), the catalyst particle size tends to increase due to sintering. In general, therefore, the emission control catalyst is most likely to deteriorate in a state of high temperature and lean exhaust air-fuel ratio. However, in the case of the stoichiometric air-fuel ratio or rich air-fuel ratios, the sintering is unlikely to occur and the catalyst undergoes substantially no deterioration even if the catalyst temperature is high.

SUMMARY OF THE INVENTION

The invention thus effectively retards deterioration of an emission control catalyst. A first aspect of the invention relates to an emission control apparatus of an internal combustion engine that reduces the temperature of an emission control catalyst disposed in an engine exhaust passage to retard deterioration of the catalyst by supplying fresh air to the emission control catalyst during a decelerating operation of the engine. If a condition for executing a fuel cut operation for stopping the supply of fuel to the engine during the decelerating operation of the engine is met, the internal combustion engine emission control apparatus starts supplying the fresh air to the emission control catalyst before the fuel cut operation starts.

In the emission control apparatus of the internal combustion engine of the first aspect, fresh air is supplied to the emission control catalyst during the decelerating operation of the engine, for example, if the temperature of the emission control catalyst needs to be reduced. Therefore, due to a synergistic effect of the reduction in the temperature of the emission control catalyst caused by the decelerating operation of the engine and the reduction in the temperature of the emission control catalyst caused by the supply of fresh air to the emission control catalyst, it is possible to quickly reduce the temperature of the emission control catalyst. That is, in this aspect, the temperature of the emission control catalyst can be more quickly reduced than in a case where air is not supplied to an emission control catalyst during a decelerating operation of the engine. Furthermore, the emission control apparatus of the first aspect does not require a high durability for a reflux device for refluxing exhaust, such as a pump and the like, and does not need means for cooling exhaust gas. Therefore, cost increases can be avoided.

In some cases, the fuel cut operation of stopping the supply of fuel to the engine is performed during a decelerating operation of the engine. Execution of the fuel cut operation causes an extremely lean air-fuel ratio of engine exhaust gas. During the fuel-cut operation, the exhaust temperature reduces, and therefore the temperature of the emission control catalyst also reduces. At the beginning of the fuel cut, however, the temperature of the emission control catalyst is high. Therefore, a condition of a high temperature and a lean air-fuel ratio is met at the beginning of the fuel cut, and deterioration of the catalyst may be accelerated. In the emission control apparatus of the internal combustion engine of the first aspect, if the fuel cut executing condition is met during a deceleration of the engine, fresh air is supplied to the engine before the fuel cut is actually performed. Therefore, the catalyst temperature starts to drop before the fuel cut is actually started. Hence, acceleration of the deterioration of the emission control catalyst at the beginning of the fuel cut is suppressed.

A second aspect of the invention relates to an emission control apparatus of an internal combustion engine that reduces a temperature of an emission control catalyst disposed in an engine exhaust passage to retard deterioration of the emission control catalyst by supplying fresh air to the emission control catalyst during a decelerating operation of the engine. This emission control apparatus supplies the fresh air to the emission control catalyst when the temperature of the emission control catalyst is higher than a predetermined temperature and an air-fuel ratio is a lean air-fuel ratio.

In the emission control apparatus of the second aspect, only if during the decelerating operation of the engine, the catalyst temperature is high and the air-fuel ratio is on the lean side, that is, only in a case where deterioration of the catalyst will be accelerated, fresh air is supplied to the emission control catalyst to quickly reduce the catalyst temperature. Therefore, the supply of fresh air is performed only when the supply of fresh air is needed in order to retard deterioration of the catalyst. Thus, excessive temperature fall of the catalyst and increase in the engine fuel consumption are suppressed.

A third aspect of the invention relates to an emission control apparatus of an internal combustion engine that reduces a temperature of an emission control catalyst disposed in an engine exhaust passage to retard deterioration of the emission control catalyst by supplying fresh air to the emission control catalyst during a decelerating operation of the engine. The emission control apparatus further has, in an engine intake passage, a throttle valve whose degree of opening is variable independently of an amount of depression of an accelerator pedal. During the decelerating operation of the engine, the emission control apparatus increases the degree of opening of the throttle valve so that an air that has passed through a combustion chamber is supplied as the fresh air to the emission control catalyst.

In the internal combustion engine emission control apparatus of the third aspect, fresh air is supplied to the catalyst via the combustion chamber by increasing the degree of throttle valve opening during the decelerating operation of the engine although the throttle valve is normally completely closed during the decelerating operation. Therefore, it becomes possible to quickly cool the emission control catalyst without using a device for supplying secondary air, such as an air pump or the like.

A fourth aspect of the invention relates to an emission control apparatus of an internal combustion engine that reduces a temperature of an emission control catalyst disposed in an engine exhaust passage to retard deterioration of the emission control catalyst by supplying fresh air to the emission control catalyst during a decelerating operation of the engine. This emission control apparatus sets the amount of fresh air supplied to the catalyst on the basis of the temperature of the emission control catalyst.

In the emission control apparatus of the fourth aspect, the amount of fresh air supplied to the catalyst is set on the basis of the temperature of the emission control catalyst. Therefore, for example, if the temperature of the emission control catalyst is very high, the temperature of the catalyst can be reliably reduced to a temperature range in which deterioration of the catalyst is not caused, by increasing one or both of the amount of flow of fresh air and the duration of supply of fresh air to increase the amount of fresh air supplied to the catalyst. If the temperature of the emission control catalyst is relatively low, the amount of air supplied to the catalyst is reduced, thus suppressing a reduction in the catalyst temperature that is more than necessary.

A fifth aspect of the invention relates to an emission control apparatus of an internal combustion engine that reduces a temperature of an emission control catalyst disposed in an engine exhaust passage to retard deterioration of the emission control catalyst by supplying fresh air to the emission control catalyst during a decelerating operation of the engine. This emission control apparatus supplies fuel to the engine in such a manner that an air-fuel ratio of an exhaust that reaches the emission control catalyst becomes equal to one of a stoichiometric air-fuel ratio and a rich air-fuel ratio when the fresh air is supplied.

This emission control apparatus suppresses the air-fuel ratio of engine exhaust from becoming a lean air-fuel ratio even when fresh air is supplied to the catalyst to reduce the temperature of the catalyst. Therefore, even when the catalyst is in a relatively high-temperature state, such as at the beginning of the supply of fresh air or the like, exposure of the catalyst to lean air-fuel ratio exhaust is suppressed. Thus, accelerated deterioration of the catalyst caused by a high-temperature and lean atmosphere is avoided.

A sixth aspect of the invention relates to a method for retarding deterioration of an emission control catalyst of an internal combustion engine. The catalyst deterioration retarding method of the sixth aspect includes the step of determining whether a condition for executing a fuel cut operation of stopping a supply of fuel to the engine during a decelerating operation of the engine is met, the step of starting supplying fresh air to the emission control catalyst if it is determined that the condition for executing the fuel cut operation is met, and the step of starting the fuel cut operation after the fresh air starts to be supplied.

In the catalyst deterioration retarding method of the sixth aspect, if the fuel cut executing condition is met during a deceleration of the engine, fresh air is supplied to the engine before the fuel cut is actually performed. Therefore, the catalyst temperature starts to drop before the fuel cut is actually started. Hence, acceleration of the deterioration of the emission control catalyst at the beginning of the fuel cut is suppressed.

A seventh aspect of the invention relates to a method for retarding deterioration of an emission control catalyst of an internal combustion engine. The catalyst deterioration retarding method of the seventh aspect includes the step of determining whether the engine is in a decelerating operation, the step of determining a temperature of the emission control catalyst, the step of determining an air-fuel ratio of an exhaust that reaches the emission control catalyst, and the step of supplying fresh air to the emission control catalyst if it determined that the engine is in the decelerating operation, the determined temperature of the emission control catalyst is higher than a predetermined temperature and the air-fuel ratio determined is a lean air-fuel ratio.

In the catalyst deterioration retarding method of the seventh aspect, only if during the decelerating operation of the engine, the catalyst temperature is high and the air-fuel ratio is on the lean side, that is, only in a case where deterioration of the catalyst will be accelerated, fresh air is supplied to the emission control catalyst to quickly reduce the catalyst temperature. Therefore, the supply of fresh air is performed only when the supply of fresh air is needed to retard deterioration of the catalyst. Thus, an excessive temperature fall of the catalyst and increase in the engine fuel consumption are suppressed.

An eighth aspect of the invention relates to a method for retarding deterioration of an emission control catalyst of an internal combustion engine. The catalyst deterioration retarding method of the eighth aspect is intended for an emission control catalyst of an internal combustion engine that has, in an engine intake passage, a throttle valve whose degree of opening is variable independently of an amount of depression of an accelerator pedal. The catalyst deterioration retarding method of whether the eighth aspect includes the step of determining the engine is in a decelerating operation, and the step of supplying air that has passed through a combustion chamber as fresh air to the emission control catalyst by increasing the degree of opening of the throttle valve if it is determined that the engine is in the decelerating operation.

In the catalyst deterioration retarding method of the eighth aspect, fresh air is supplied to the catalyst via the combustion chamber by increasing the degree of throttle valve opening during the decelerating operation of the engine although the throttle valve is normally completely closed during the decelerating operation. Therefore, it becomes possible to quickly cool the emission control catalyst without using a device for supplying secondary air, such as an air pump or the like.

A ninth aspect of the invention relates to a method for retarding deterioration of an emission control catalyst of an internal combustion engine. The catalyst deterioration retarding method of the ninth aspect includes the step of determining whether the engine is in a decelerating operation, the step of determining a temperature of the emission control catalyst, the step of setting an amount of fresh air on the basis of the determined temperature of the emission control catalyst, and the step of supplying the emission control catalyst with the set amount of fresh air if it is that the engine is in the decelerating operation.

In the catalyst deterioration retarding method of the ninth aspect, the amount of fresh air supplied to the catalyst is set on the basis of the temperature of the emission control catalyst. Therefore, for example, if the temperature of the emission control catalyst is very high, the temperature of the catalyst can be reliably reduced to a temperature range in which deterioration of the catalyst is not caused, by increasing one or both of the amount of flow of fresh air and the duration of supply of fresh air to increase the amount of fresh air supplied to the catalyst. If the temperature of the emission control catalyst is relatively low, the amount of air supplied to the catalyst is reduced, thus suppressing a reduction in the catalyst temperature that is more than necessary.

A tenth aspect of the invention relates to a method for retarding deterioration of an emission control catalyst of an internal combustion engine. The catalyst deterioration retarding method of the tenth aspect includes the step of determining whether the engine is in a decelerating operation, the step of setting an amount of fuel injected so as to make an air-fuel ratio of an exhaust that reaches the emission control catalyst equal to one of a stoichiometric air-fuel ratio and a rich air-fuel ratio, and the step of supplying the set amount of fuel to the engine if it is determined that the engine is in a decelerating operation.

The catalyst deterioration retarding method of the tenth aspect suppress the air-fuel ratio of engine exhaust from becoming a lean air-fuel ratio even when fresh air is supplied to the catalyst to reduce the temperature of the catalyst. Therefore, even when the catalyst is in a relatively high-temperature state, such as at the beginning of the supply of fresh air or the like, exposure of the catalyst to lean air-fuel ratio exhaust is suppressed. Thus, accelerated deterioration of the catalyst caused by a high-temperature and lean atmosphere is avoided.

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein.

DETAILED DESCRIPTION OF PREFERRED EMBODIMENTS

Figure 1:
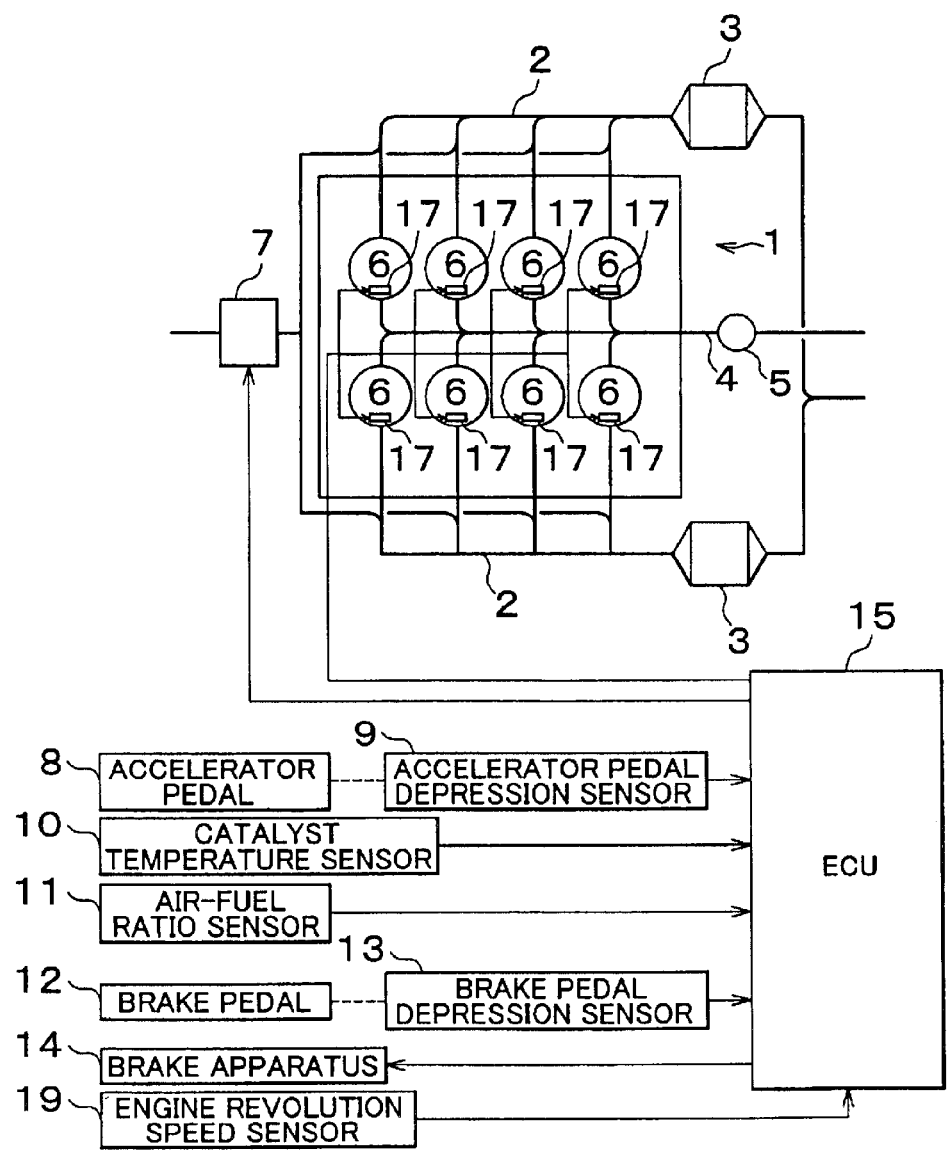
FIG. 1 is a diagram schematically illustrating a construction of an exemplary embodiment in which an internal combustion engine emission control apparatus in accordance with the invention is applied to an automotive engine.

FIG. 1 is a schematic diagram illustrating a construction of an emission control apparatus of an internal combustion engine in accordance with a first exemplary embodiment of the invention. As shown in FIG. 1, an engine exhaust passage 2 and an engine intake passage 4 are connected to an engine body 1. A combustion chamber is formed in each cylinder 6. An injector 17 is provided with each cylinder 6.

A secondary air supplier device 7 has an air pump driven by an electric motor. The secondary air supplier device 7 introduces external air (secondary air) into the engine exhaust passage 2, without passing through the engine combustion chambers. Thus, secondary air is supplied to an emission control catalyst 3 disposed in the engine exhaust passage 2. At the time of startup of the engine, the secondary air supplier device 7 is operated to accelerate the temperature rise (warm-up) of the catalyst by supplying secondary air to the emission control catalyst 3.

FIG. 1 also shows an accelerator pedal depression sensor 9 for detecting the amount of depression of an accelerator pedal 8.

In this exemplary embodiment, a throttle valve 5 disposed in the engine intake passage 4 is driven by an actuator (not shown), such as a step motor or the like, to assume a degree of opening corresponding to a drive signal from an ECU 15 as described below. In this exemplary embodiment, during a normal operation, the throttle valve 5 is controlled by the ECU 15 to assume a degree of opening corresponding to the amount of depression of the accelerator pedal 8 caused by a driver. However, for example, if the temperature of the emission control catalyst 3 needs to be reduced during a decelerating engine operation, the degree of opening of the throttle valve 5 can be set independently of the amount of depression of the accelerator pedal 8 caused by a driver.

A catalyst temperature sensor 10 detects the temperature of an emission control catalyst S. The ECU 15 may estimate the temperature of the emission control catalyst S by engine revolution speed detected by the engine revolution speed sensor 19 as a tenth exemplary embodiment described below. Furthermore, as indicated in FIG. 1, the first exemplary embodiment adopts an air-fuel ratio sensor 11 whose output value gradually changes as the air-fuel ratio shifts from a fuel-lean side to a fuel-rich side. In other exemplary embodiments, however, the air-fuel ratio sensor 11 may be replaced by an $O_2$ sensor whose output value sharply changes at around the stoichiometric air-fuel ratio.

A brake pedal depression sensor 13 detects the amount of depression of a brake pedal 12.

The electronic control unit (ECU) 15 is formed by, for example, a known microcomputer. In this exemplary embodiment, a brake apparatus 14 includes a brake oil pressure control device (not shown), and is capable of producing braking force corresponding to a drive signal from the ECU 15. During a normal operation, the ECU 15 controls the brake apparatus 14 to produce braking force in accordance with the amount of driver's depression of the brake pedal 12 detected by the brake pedal depression sensor 13. However, for example, if during a decelerating engine operation, an operation is performed which increases the degree of opening of the throttle valve 5, the ECU 15 controls the brake apparatus 14 through the use of the brake oil pressure control device so that the braking force increases even if the amount of depression of the brake pedal 12 does not increase, as described below. Further, for example, if exhaust air-fuel ratio at the stoichiometric air-fuel ratio or on the rich side during the supply of fuel air is kept, ECU 15 controls injector 17 to inject a fuel to engine 1.

Figure 2:
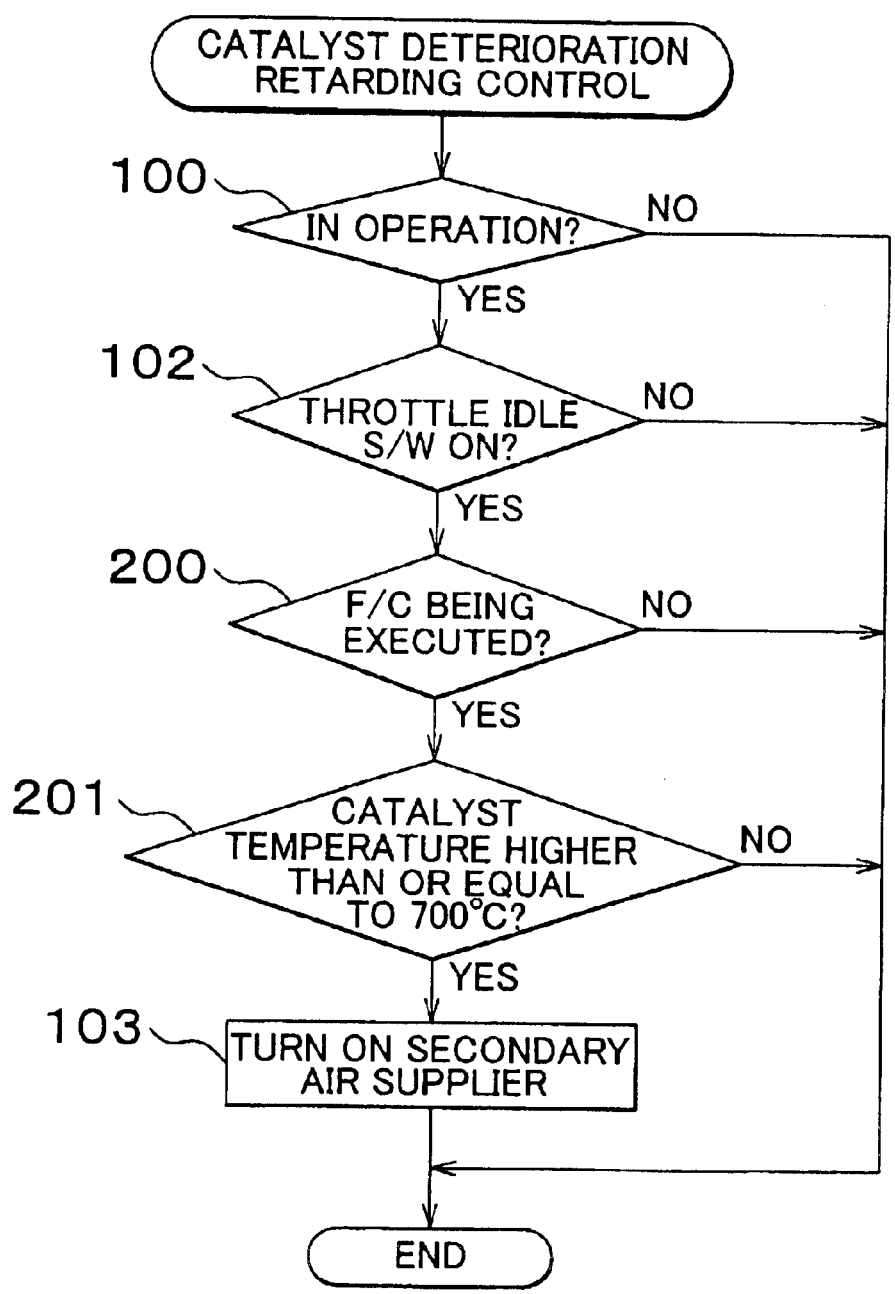
FIG. 2 is a flowchart illustrating a first exemplary embodiment the control method for retarding deterioration of the catalyst in the emission control apparatus shown in FIG. 1.

An internal combustion engine emission control apparatus in accordance with a first exemplary embodiment of the invention will be described below. FIG. 2 is a flowchart illustrating a control method for retarding the catalyst deterioration in accordance with the first exemplary embodiment. The operation illustrated in FIG. 2 is carried out by a routine executed by the ECU 15 at predetermined time intervals. As shown in FIG. 2, when the routine starts, it is first determined in step 100 whether the engine is in operation. If the result of determination is "YES", the operation proceeds to step 102. If the result of determination is "NO", this routine ends. In step 102, it is determined whether the throttle idle switch in on, that is, whether the accelerator pedal 8 is completely released. If the result of determination is "YES", it is considered that the engine is in a decelerating operation, and the operation proceeds to step 200. Conversely, if the result of determination is "NO", this routine ends.

Figure 3:
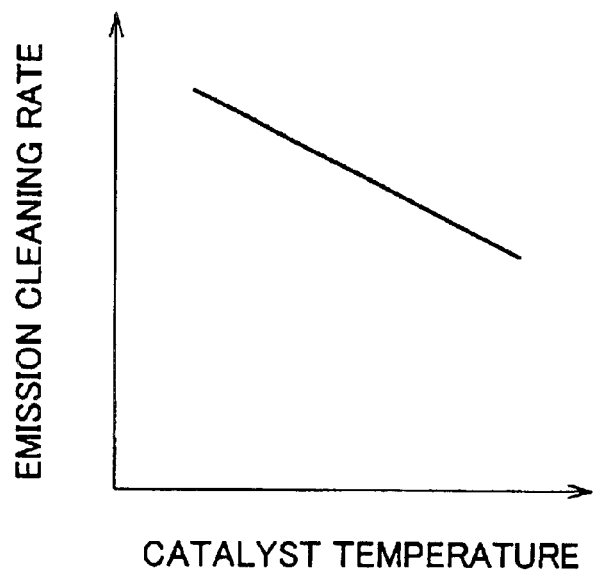
FIG. 3 is a diagram indicating a relationship between the temperature of the emission control catalyst and the emission cleaning rate of the emission control catalyst.
Figure 4:
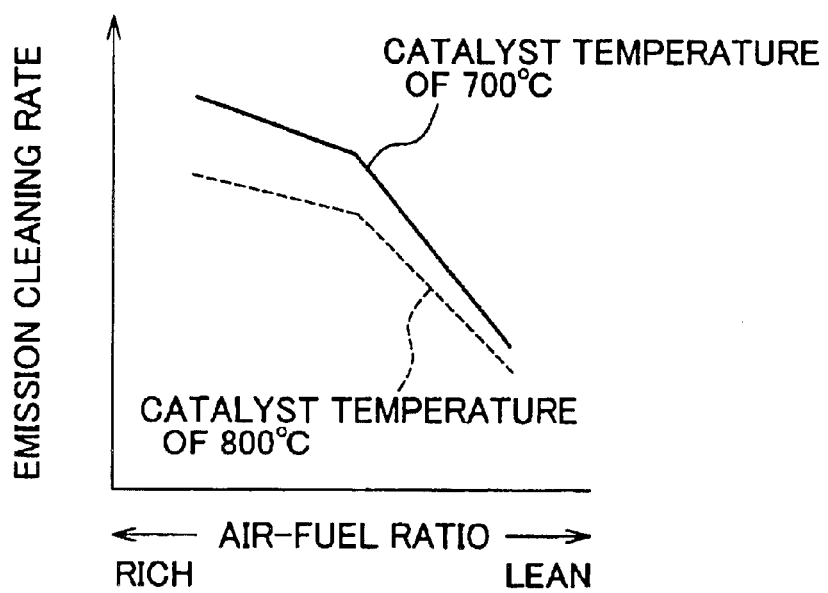
FIG. 4 is a diagram indicating a relationship among the temperature of the emission control catalyst, the air-fuel ratio and the emission cleaning rate of the emission control catalyst.

In step 200, it is determined whether a fuel cut is being performed. FIG. 3 is a diagram indicating a relationship between the catalyst temperature of an emission control catalyst and the emission cleaning rate of the emission control catalyst. As indicated in FIG. 3, the emission cleaning rate decreases as the catalyst temperature increases above an appropriate temperature. FIG. 4 is a diagram indicating a relationship among the catalyst temperature of the emission control catalyst, the air-fuel ratio and the emission cleaning rate of the emission control catalyst. As indicated in FIG. 4, the emission cleaning rate is lower at a catalyst temperature of 800° C. than at a catalyst temperature of 700° C. The emission cleaning rate decreases as the air-fuel ratio shifts toward a leaner side.

Referring back to FIG. 2, if it is determined in step 200 that the fuel cut is being performed, that is, if it is determined that the air-fuel ratio is on the lean side of the stoichiometric air-fuel ratio, it is then considered that the emission control catalyst 3 needs to be quickly cooled, and the operation proceeds to step 201. Conversely, if the result of determination is "NO", this routine ends. In step 201, it is determined whether the catalyst temperature of the emission control catalyst 3 is greater than or equal to 700° C. based on an output value from the catalyst temperature sensor 10. If it is determined in step 201 that the catalyst temperature of the emission control catalyst 3 is greater than or equal to 700° C., it is considered that the emission control catalyst 3 needs to be quickly cooled, and the operation proceeds to step 103. Conversely, if the result of determination is "NO", this routine ends. In step 103, fresh air is supplied as secondary air to the emission control catalyst 3 by the secondary air supplier device 7.

According to the first exemplary embodiment, it is taken into consideration that the temperature of the emission control catalyst 3 tends to decrease during a deceleration operation of the engine. That is, if it is determined in step 102 that the engine is in the decelerating operation and it is determined in step 201 that it is necessary to reduce the temperature of the emission control catalyst 3, fresh air is supplied to the emission control catalyst 3 in step 103. Therefore, due to a synergistic effect of the reduction in the temperature of the emission control catalyst 3 caused by the engine decelerating operation and the reduction in the temperature of the emission control catalyst 3 caused by the supply of fresh air to the emission control catalyst 3, it is possible to quickly reduce the temperature of the emission control catalyst 3.

Furthermore, according to the first exemplary embodiment, it is taken into consideration that when the temperature of the emission control catalyst 3 is high and the air-fuel ratio is on the lean side, the emission control catalyst 3 is likely to deteriorate, and therefore it is necessary to quickly reduce the temperature of the emission control catalyst 3. That is, if it is determined in step 102 that the engine is in the decelerating operation and it is determined in step 200 that the air-fuel ratio is on the lean side and it is determined in step 201 that the temperature of the emission control catalyst 3 is high, fresh air is supplied to the emission control catalyst 3 in step 103. Therefore, the temperature of the emission control catalyst 3 is quickly reduced, so that deterioration of the emission control catalyst 3 can be prevented.

Still further, according to the first exemplary embodiment, if it is determined in step 102 that the engine is in the decelerating operation, secondary air that has not passed through a combustion chamber is supplied as fresh air to the emission control catalyst 3 in step 103. In this case, therefore, the temperature of the emission control catalyst 3 can be more effectively reduced than in the case where relatively high-temperature air that has passed through a combustion chamber is supplied to the emission control catalyst 3.

Figure 5:
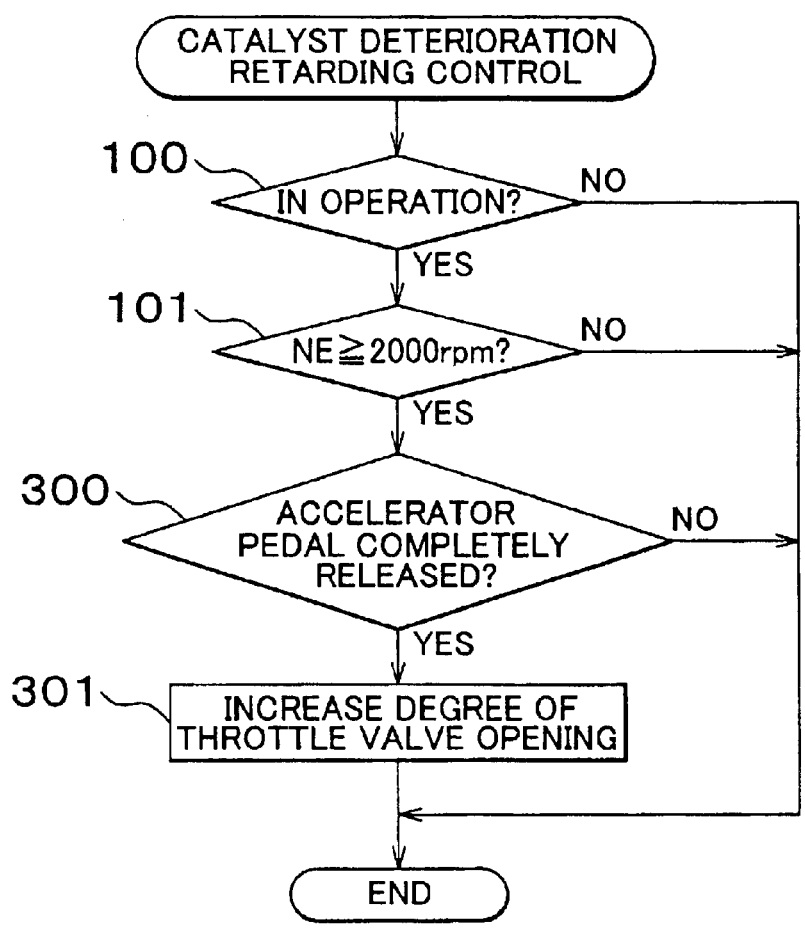
FIG. 5 is a flowchart illustrating a second exemplary embodiment of the control method for retarding deterioration of the catalyst in the emission control apparatus shown in FIG. 1.

An internal combustion engine emission control apparatus in accordance with a second exemplary embodiment of the invention will be described below. The construction of the second embodiment is substantially the same as that of the first exemplary embodiment shown in FIG. 1. FIG. 5 is a flowchart illustrating a control method for retarding the catalyst deterioration in accordance with the second exemplary embodiment. The operation illustrated in FIG. 5 is carried out as a routine executed by the ECU 15 at predetermined time intervals. As shown in FIG. 5, when the routine starts, it is first determined in step 100 whether the engine is in operation. If the result of determination is "YES", the operation proceeds to step 101. If the result of determination is "NO", this routine ends. In step 101, it is determined whether the engine revolution speed NE is greater than or equal to 2000 rpm based on an output value from an engine revolution sensor 19. If the engine revolution speed NE is greater than or equal to 2000 rpm, it is considered that there is a danger that the emission control catalyst 3 will have high temperature, and the operation proceeds to step 300. Conversely, if the engine revolution speed NE is less than 2000 rpm, it is considered that the danger of high temperature of the emission control catalyst 3 does not exist, and this routine ends.

In step 300, it is determined whether the accelerator pedal 8 is completely released. If the result of determination is "YES", it is considered that the engine is in a decelerating operation, and the operation proceeds to step 301. Conversely, if the result of determination is "NO", this routine ends. In step 301, the degree of opening of the throttle valve 5 is increased to supply air that has passed through a combustion chamber as fresh air to the emission control catalyst 3.

According to the second exemplary embodiment, it is taken into consideration that the temperature of the emission control catalyst 3 tends to decrease during a deceleration operation of the engine. That is, if it is determined in step 101 that it is necessary to reduce the temperature of the emission control catalyst 3 and it is determined in step 300 that the engine is in the decelerating operation, air that has passed through a combustion chamber is supplied as fresh air to the emission control catalyst 3 in step 301. Therefore, due to a synergistic effect of the reduction in the temperature of the emission control catalyst 3 caused by the engine decelerating operation and the reduction in the temperature of the emission control catalyst 3 caused by the supply of fresh air to the emission control catalyst 3, it is possible to quickly reduce the temperature of the emission control catalyst 3. In order to increase the reduction in the temperature of the emission control catalyst 3 caused by the supply of the air that has passed through a combustion chamber to the emission control catalyst 3, it is preferable that the air that has passed through the combustion chambers be discharged into the engine exhaust passage 2 instead of being burned as air-fuel mixture in the combustion chambers.

Furthermore, according to the second exemplary embodiment, it is taken into consideration that the air supplied into the combustion chambers during the decelerating operation of the engine passes through the combustion chambers without being burned to increase temperature. That is, if it is determined in step 300 that the engine is in the decelerating operation, the degree of opening of the throttle valve 5 is increased in step 301, so that the air that has passed through the combustion chambers is supplied as fresh air to the emission control catalyst 3. Therefore, the temperature of the emission control catalyst 3 can be effectively reduced, as is the case with the first exemplary embodiment, in which secondary air that has not passed through a combustion chamber is supplied as fresh air to the emission control catalyst 3.

Figure 6:
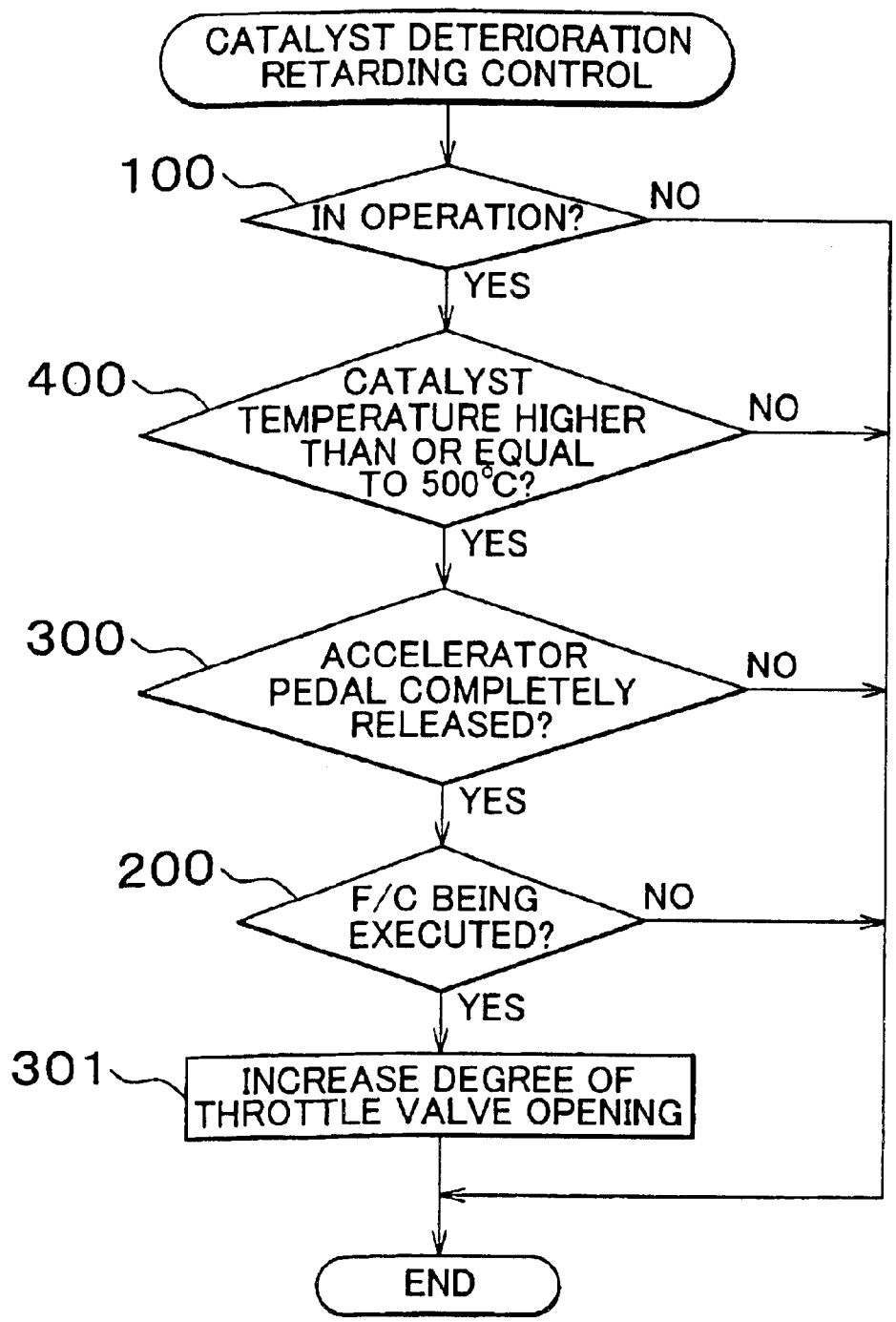
FIG. 6 is a flowchart illustrating a third exemplary embodiment of the control method for retarding deterioration of the catalyst in the emission control apparatus shown in FIG. 1.

An internal combustion engine emission control apparatus in accordance with a third exemplary embodiment of the invention will be described below. The construction of the third exemplary embodiment is substantially the same as that of the first exemplary embodiment shown in FIG. 1. FIG. 6 is a flowchart illustrating a control method for retarding the catalyst deterioration in accordance with the third exemplary embodiment. The operation illustrated in FIG. 6 is carried out as a routine executed by the ECU 15 at predetermined time intervals. As shown in FIG. 6, when the routine starts, it is first determined in step 100 whether the engine is in operation. If the result of determination is "YES", the operation proceeds to step 400. If the result of determination is "NO", this routine ends. In step 400, it is determined whether the catalyst temperature of the emission control catalyst 3 is greater than or equal to 500° C. based on an output value from the catalyst temperature sensor 10. If the result of determination is "YES", the operation proceeds to step 300. If the result of determination is "NO", this routine ends.

In step 300, it is determined whether the accelerator pedal 8 is completely released. If the result of determination is "YES", it is considered that the engine is in a decelerating operation, and the operation proceeds to step 200. Conversely, if the result of determination is "NO", this routine ends. In step 200, it is determined whether the fuel cut is being performed. If it is determined in step 200 that the fuel cut is being performed, that is, if it is determined that the air-fuel ratio is on the lean side, it is then considered that the emission control catalyst 3 needs to be quickly cooled, and the operation proceeds to step 301. That is, if it is determined in step 400 that the catalyst temperature of the emission control catalyst 3 is high and it is determined in step 200 that the air-fuel ratio is on the lean side, it is then considered that the emission control catalyst 3 needs to be quickly cooled, and the operation proceeds to step 301. Conversely, if the result of determination is "NO" in step 200, this routine ends. In step 301, the degree of opening of the throttle valve 5 is increased to supply the air that has passed through the combustion chambers as fresh air to the emission control catalyst 3.

According to the third exemplary embodiment, it is taken into consideration that the temperature of the emission control catalyst 3 tends to decrease during a deceleration operation of the engine. That is, if it is determined in step 400 that it is necessary to reduce the temperature of the emission control catalyst 3 and it is determined in step 300 that the engine is in the decelerating operation, air that has passed through a combustion chamber is supplied as fresh air to the emission control catalyst 3 in step 301. Therefore, due to a synergistic effect of the reduction in the temperature of the emission control catalyst 3 caused by the engine decelerating operation and the reduction in the temperature of the emission control catalyst 3 caused by the supply of fresh air to the emission control catalyst 3, it is possible to quickly reduce the temperature of the emission control catalyst 3. In order to increase the reduction in the temperature of the emission control catalyst 3 caused by the supply of the air that has passed through a combustion chamber to the emission control catalyst 3, it is preferable that the air that has passed through the combustion chambers be discharged into the engine exhaust passage 2 instead of being burned as air-fuel mixture in the combustion chambers.

Furthermore, according to the third exemplary embodiment, it is taken into consideration that when the temperature of the emission control catalyst 3 is high and the air-fuel ratio is on the lean side, the emission control catalyst 3 is likely to deteriorate, and therefore it is necessary to quickly reduce the temperature of the emission control catalyst 3. That is, if it is determined in step 400 that the temperature of the emission control catalyst 3 is high, and it is determined in step 300 that the engine is in the decelerating operation, and it is determined in step 200 that the air-fuel ratio is on the lean side, fresh air is supplied to the emission control catalyst 3 in step 301. Therefore, the temperature of the emission control catalyst 3 is quickly reduced, so that deterioration of the emission control catalyst 3 can be prevented.

Still further, according to the third exemplary embodiment, it is taken into consideration that the air supplied into the combustion chambers during the decelerating operation of the engine passes through the combustion chambers without being burned to increase temperature. That is, if it is determined in step 300 that the engine is in the decelerating operation, the degree of opening of the throttle valve 5 is increased in step 301, so that the air that has passed through the combustion chambers is supplied as fresh air to the emission control catalyst 3. Therefore, the temperature of the emission control catalyst 3 can be effectively reduced, as is the case with the first exemplary embodiment, in which secondary air that has not passed through a combustion chamber is supplied as fresh air to the emission control catalyst 3.

Figure 7:
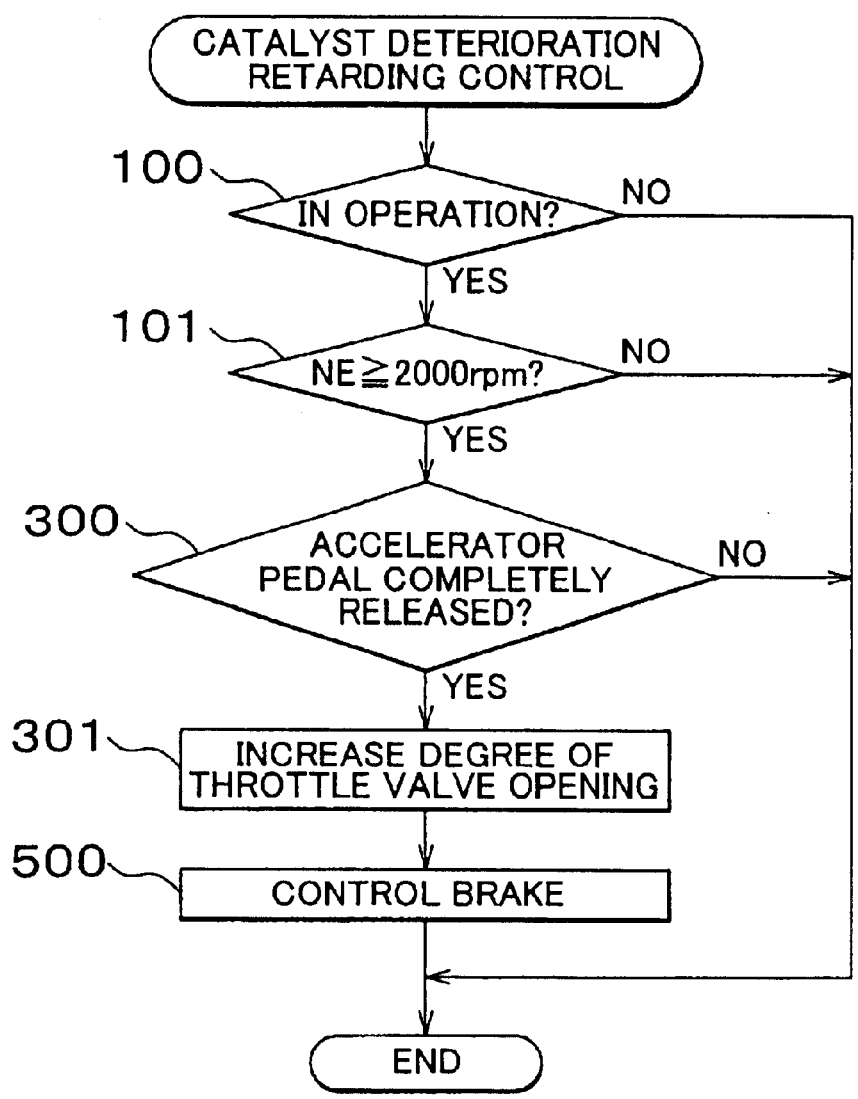
FIG. 7 is a flowchart illustrating a fourth exemplary embodiment of the control method for retarding deterioration of the catalyst in the emission control apparatus shown in FIG. 1.

An internal combustion engine emission control apparatus in accordance with a fourth exemplary embodiment of the invention will be described below. The construction of the fourth exemplary embodiment is substantially the same as that of the first exemplary embodiment shown in FIG. 1. FIG. 7 is a flowchart illustrating a control method for retarding the catalyst deterioration in accordance with the fourth exemplary embodiment. The operation illustrated in FIG. 7 is carried out as a routine executed by the ECU 15 at predetermined time intervals. As shown in FIG. 7, when the routine starts, it is first determined in step 100 whether the engine is in operation. If the result of determination is "YES", the operation proceeds to step 101. If the result of determination is "NO", this routine ends. In step 101, it is determined whether the engine revolution speed NE is greater than or equal to 2000 rpm based on an output value from an engine revolution sensor 19. If the engine revolution speed NE is greater than or equal to 2000 rpm, it is considered that there is a danger that the emission control catalyst 3 will have high temperature, and the operation proceeds to step 300. Conversely, if the engine revolution speed NE is less than 2000 rpm, it is considered that the danger of high temperature of the emission control catalyst 3 does not exist, and this routine ends.

In step 300, it is determined whether the accelerator pedal 8 is completely released. If the result of determination is "YES", it is considered that the engine is in a decelerating operation, and the operation proceeds to step 301. Conversely, if the result of determination is "NO", this routine ends. In step 301, the degree of opening of the throttle valve 5 is increased so that air that has passed through a combustion chamber is supplied as fresh air to the emission control catalyst 3. Subsequently in step 500, the braking force produced by the brake apparatus 14 is increased because the braking force produced based on the engine braking effect reduces as the degree of opening of the throttle valve 5 is increased in step 301. More specifically, the brake apparatus 14 is controlled so that the braking force produced by the brake apparatus 14 increases even though a driver does not increase the amount of depression of the brake pedal 12.

According to the fourth exemplary embodiment, it is taken into consideration that the temperature of the emission control catalyst 3 tends to decrease during a deceleration operation of the engine. That is, if it is determined in step 101 that it is necessary to reduce the temperature of the emission control catalyst 3 and it is determined in step 300 that the engine is in the decelerating operation, air that has passed through a combustion chamber is supplied as fresh air to the emission control catalyst 3 in step 301. Therefore, due to a synergistic effect of the reduction in the temperature of the emission control catalyst 3 caused by the engine decelerating operation and the reduction in the temperature of the emission control catalyst 3 caused by the supply of fresh air to the emission control catalyst 3, it is possible to quickly reduce the temperature of the emission control catalyst 3. In order to increase the reduction in the temperature of the emission control catalyst 3 caused by the supply of the air that has passed through a combustion chamber to the emission control catalyst 3, it is preferable that the air that has passed through the combustion chambers be discharged into the engine exhaust passage 2 instead of being burned as air-fuel mixture in the combustion chambers.

Furthermore, according to the fourth exemplary embodiment, it is taken into consideration that the air supplied into the combustion chambers during the decelerating operation of the engine passes through the combustion chambers without being burned to increase temperature. That is, if it is determined in step 300 that the engine is in the decelerating operation, the degree of opening of the throttle valve 5 is increased in step 301, so that the air that has passed through the combustion chambers is supplied as fresh air to the emission control catalyst 3. Therefore, the temperature of the emission control catalyst 3 can be effectively reduced, as is the case with the first exemplary embodiment, in which secondary air that has not passed through a combustion chamber is supplied as fresh air to the emission control catalyst 3.

Furthermore, in the fourth exemplary embodiment, if it is determined in step 300 that the engine is in the decelerating operation and in step 301 the degree of opening of the throttle valve 5 is increased, the brake apparatus 14 is controlled in step 500 so that the braking force produced by the brake apparatus 14 increases even though a driver does not increase the amount of depression of the brake pedal 12. Therefore, it is possible to prevent an event that the actual braking force becomes insufficient relatively to a needed braking force as the braking force based on the engine brake effect reduces due to increases in the degree of opening of the throttle valve 5 during the decelerating operation of the engine. That is, although the braking force based on the engine brake effect reduces as the degree of opening of the throttle valve 5 is increases, the braking force produced by the brake apparatus 14 is increased for a compensation. Therefore, the total of the braking force based on the engine brake effect and the braking force produced by the brake apparatus 14 does not reduce. Hence, an event that the actual braking force becomes insufficient relatively to the needed braking force is avoided.

An internal combustion engine emission control apparatus in accordance with a fifth exemplary embodiment of the invention will be described.

In FIG. 2 (first exemplary embodiment), FIG. 6 (third exemplary embodiment), and FIG. 7 (fourth exemplary embodiment), fresh air is supplied to an emission control catalyst when the fuel cut is executed during the decelerating operation of the engine, to retard the deterioration of the catalyst.

However, execution of the fuel cut achieves not only reduced exhaust temperature, but also immediately causes an extremely lean air-fuel ratio. If the catalyst temperature is high before the fuel cut is started, the catalyst temperature is not reduced immediately by the fuel cut. Therefore, lean air-fuel ratio exhaust gas is supplied to the high-temperature catalyst simultaneously with the start of the fuel cut. That is, if the fuel cut is performed when the emission control catalyst has a high temperature, the catalyst is exposed to a high-temperature atmosphere of a lean-air-fuel ratio at the time of start of the fuel cut at the beginning of the fuel cut, thus giving rise to a problem of accelerated deterioration of the catalyst.

In this exemplary embodiment, therefore, if a fuel-cut executing condition is met during a decelerating operation of the engine, the supply of air to the emission control catalyst is started before the fuel cut is actually started. Therefore, exhaust gas whose temperature has been reduced by secondary air is supplied to the emission control catalyst before the exhaust air-fuel ratio is shifted to the lean side by the fuel cut. Therefore, the temperature of the emission control catalyst can be reduced to a certain level before the beginning of the fuel cut. Thus, this exemplary embodiment is able to prevent the emission control catalyst from being exposed to a high-temperature and lean-air-fuel ratio atmosphere even if the fuel cut is executed during the deceleration of the engine. Hence, deterioration of the emission control catalyst can be effectively retarded.

Figure 8:
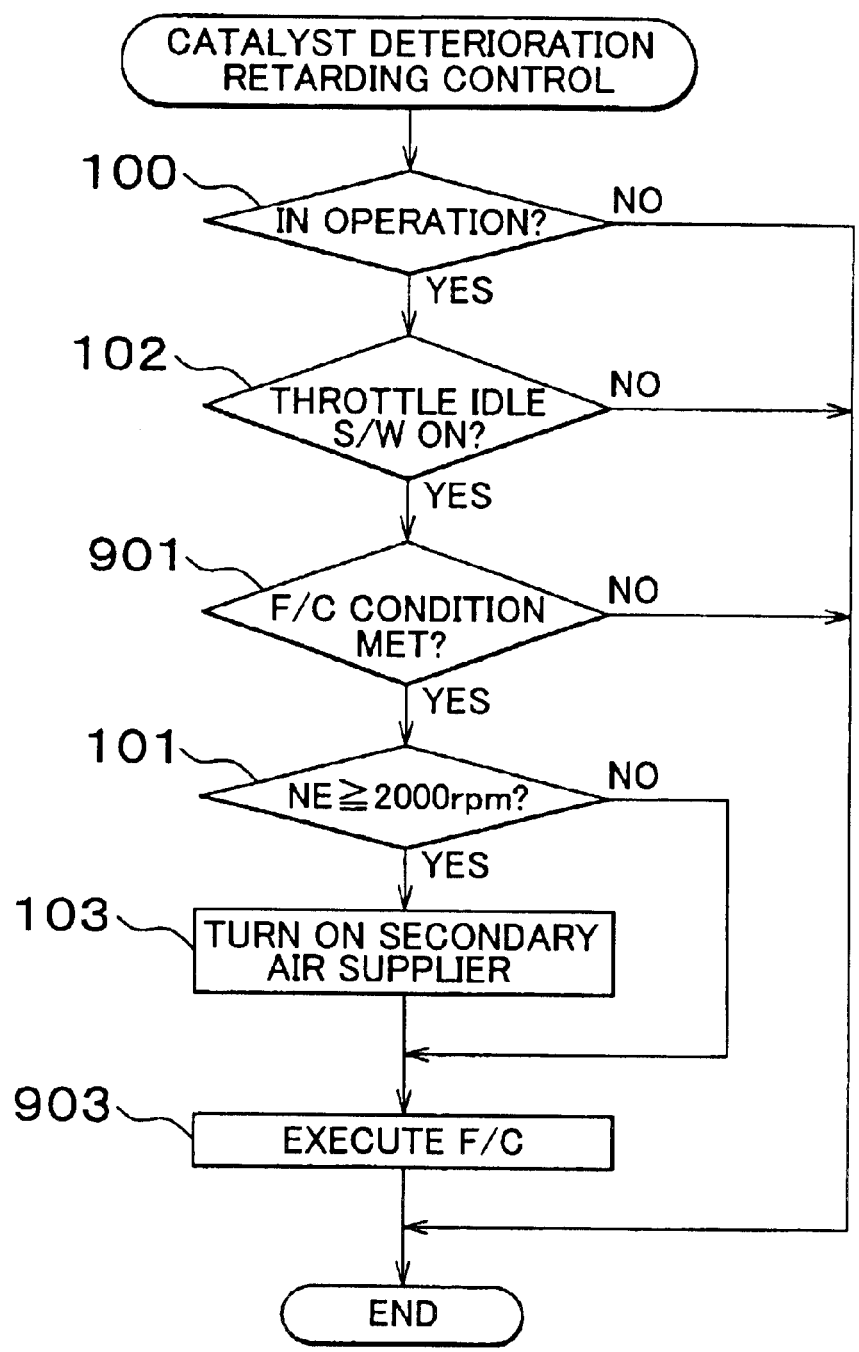
FIG. 8 is a flowchart illustrating a fifth exemplary embodiment of the control method for retarding deterioration of the catalyst in the emission control apparatus shown in FIG. 1.

FIG. 8 is a flowchart illustrating a control method for retarding detection of the catalyst in accordance with this exemplary embodiment. The operation of FIG. 8 is carried out as a routine executed by the ECU 15 at predetermined time intervals. When this routine starts, it is first determined in step 100 whether the engine is in operation as indicated in FIG. 8. If the result of determination in step 100 is "YES", the operation proceeds to step 102. If the result of determination is "NO", this routine ends.

In step 102, it is determined whether a throttle idle switch in on, that is, whether the accelerator pedal 8 is completely released. If the result of determination is "YES", it is considered that the engine is in a decelerating operation, and the operation proceeds to step 901. If the result of determination is "NO", this routine ends.

It is then determined in step 901 whether a condition for executing the fuel-cut operation is met. The fuel-cut operation executing condition in step 901 is, for example, that the engine warm-up has been completed, or that the engine revolution speed is greater than or equal to a predetermined engine revolution speed, or that the amount of depression of the accelerator pedal is zero (the accelerator is completely released), or that the vehicle running speed is greater than or equal to a predetermined value, etc.

If the fuel-cut operation executing condition is not met, the routine immediately ends because the possibility of exposure of the emission control catalyst to a high-temperature and lean air-fuel ratio atmosphere due to execution of the fuel cut does not exist.

Conversely, if it is determined in step 901 that the fuel-cut operation executing condition is met, step 101 is subsequently executed in which it is determined whether a condition for a high temperature of the catalyst exists. In step 101, it is determined whether the engine revolution speed NE is greater than or equal to 2000 rpm based on an output value from an engine revolution sensor 19. If the engine revolution speed NE is greater than or equal to 2000 rpm, it is considered that there is a danger that the emission control catalyst 3 will have high temperature, the operation proceeds to step 103, in which the supply of the secondary air as fresh air from the secondary air supplier device 7 to the emission control catalyst is started immediately. After the supply of fresh air is started, the operation proceeds to step 903, in which the supply of fuel to the engine is stopped to start the fuel-cut operation. Therefore, exhaust gas whose temperature has been reduced by fresh air reaches the emission control catalyst before exhaust gas having a considerably lean air-fuel ratio due to the fuel cut reaches the emission control catalyst. Hence, the temperature of the emission control catalyst can be reduced to a certain level before the fuel cut is started, that is, before lean air-fuel ratio exhaust gas reaches the emission control catalyst. If it is determined in step 101 that the engine revolution speed is less than or equal to the predetermined revolution speed, that is, the catalyst does not have high temperature, the operation immediately proceeds from step 101 to step 903 for the fuel cut, without execution of the supply of secondary air in step 103. The fuel-cut operation without fresh air being supplied to the emission control catalyst is executed.

According to this exemplary embodiment, the control is performed as described below during a decelerating engine operation, taking it into consideration that the temperature of the emission control catalyst 3 tends to decrease. That is, if it is determined in step 102 that the engine is in the decelerating operation and it is determined in step 101 that it is necessary to reduce the temperature of the emission control catalyst 3, fresh air is supplied to the emission control catalyst 3 in step 103. Therefore, due to a synergistic effect of the reduction in the temperature of the emission control catalyst 3 caused by the engine decelerating operation and the reduction in the temperature of the emission control catalyst 3 caused by the supply of fresh air to the emission control catalyst 3, it is possible to quickly reduce the temperature of the emission control catalyst 3.

If necessary, it is also possible to provide a delay time between the start of the supply of secondary air in step 103 and the actual start of the fuel cut in step 903, so that the temperature of the emission control catalyst will be reliably reduced before the fuel cut is started.

In the operations illustrated in FIG. 2 (first embodiment), FIG. 6 (third embodiment) and FIG. 7 (fourth embodiment), it is also possible to start the supply of fresh air before the start of the fuel cut, so that the temperature of the emission control catalyst will be reliably reduced before the start of the fuel cut, as in the operation illustrated in FIG. 8.

Figure 9:
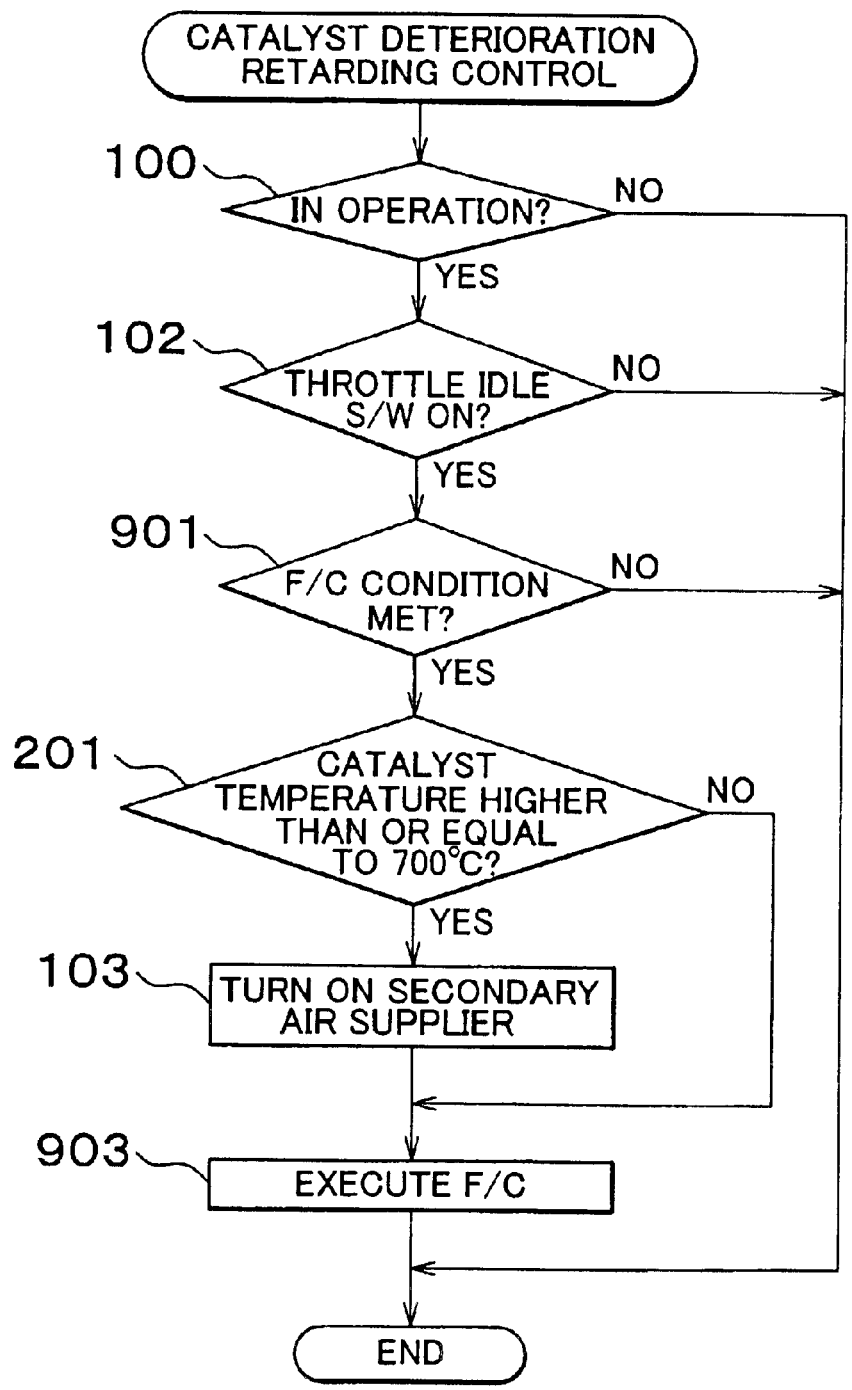
FIG. 9 is a flowchart illustrating a modification of the fifth embodiment of the control method for retarding deterioration of the catalyst.
Figure 10:
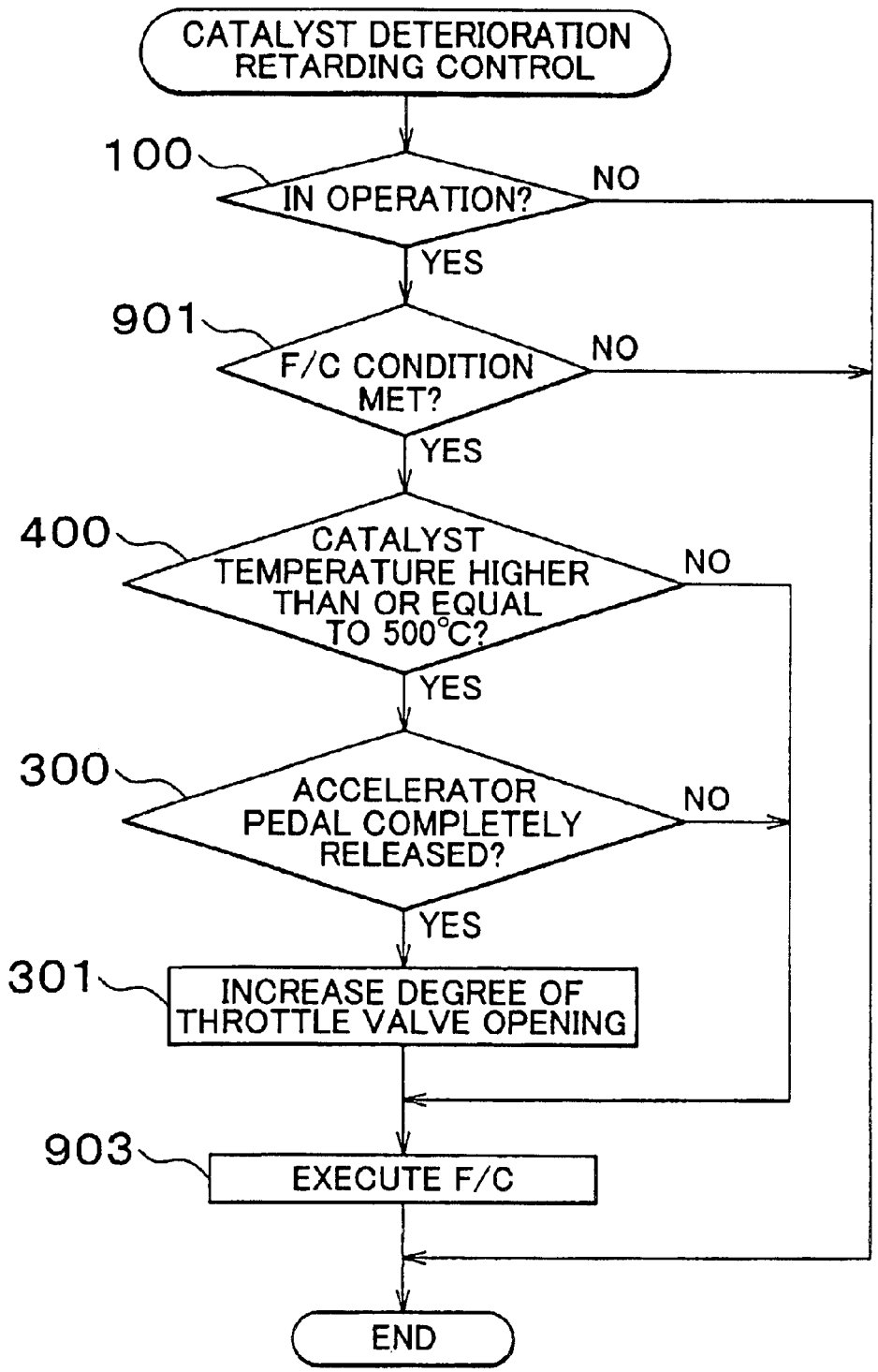
FIG. 10 is a flowchart illustrating another modification of the fifth exemplary embodiment of the control method for retarding deterioration of the catalyst.
Figure 11:
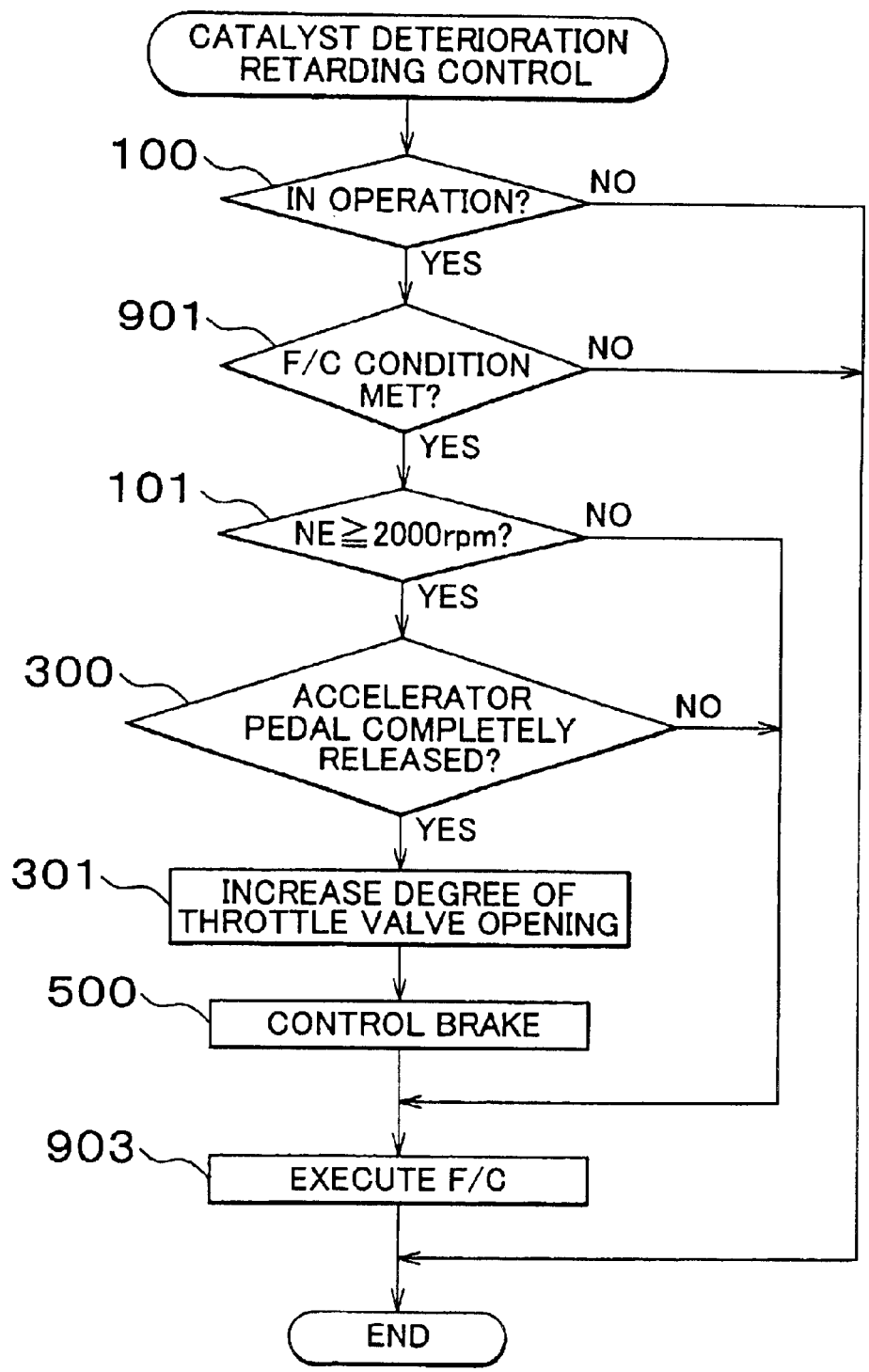
FIG. 11 is a flowchart illustrating still another modification of the fifth exemplary embodiment of the control method for retarding deterioration of the catalyst.

FIGS. 9, 10 and 11 illustrate operations in which the process described with reference to FIG. 8 (i.e. determining in step 901 if the fuel-cut operation executing condition is met and step 903 for executing the fuel-cut operation) is added to the embodiments illustrated in FIGS. 2, 6 and 7, respectively. In FIGS. 9 to 11, step numbers identical to those in FIGS. 2, 6, 7 and 8 represent processes identical to the processes illustrated in FIGS. 2, 6, 7 and 8. Thus, the contents of the control operations illustrated in FIGS. 9 to 11 will become apparent from the descriptions of FIGS. 2, 6, 7 and 8. Therefore, detailed descriptions of FIGS. 9 to 11 are omitted.

An internal combustion engine emission control apparatus in accordance with a sixth exemplary embodiment of the invention will be described.

In the foregoing exemplary embodiments, the amount of fresh air supplied to the emission control catalyst is fixed regardless of the temperature of the emission control catalyst at the time of start of the supply of fresh air. However, in reality, the temperature of the emission control catalyst at the beginning of the supply of fresh air varies although the temperature is high. Therefore, if the amount of fresh air supplied is fixed regardless of whether the temperature of the emission control catalyst is high or low, there may be a case where if the temperature is high, the temperature of the emission control catalyst cannot be sufficiently reduced, and therefore the deterioration of the catalyst cannot be sufficiently retarded, or a case where if the temperature is low, the temperature of the emission control catalyst is excessively reduced, and therefore a sufficient catalyst effect cannot be achieved when the emission control is restarted after the decelerating operation of the engine.

In this exemplary embodiment, at least one of the duration of supply of fresh air and the amount of supply of fresh air is controlled in accordance with the catalyst temperature at the beginning of the supply of fresh air, so that the catalyst temperature will be reduced to an appropriate temperature range.

Figure 12:
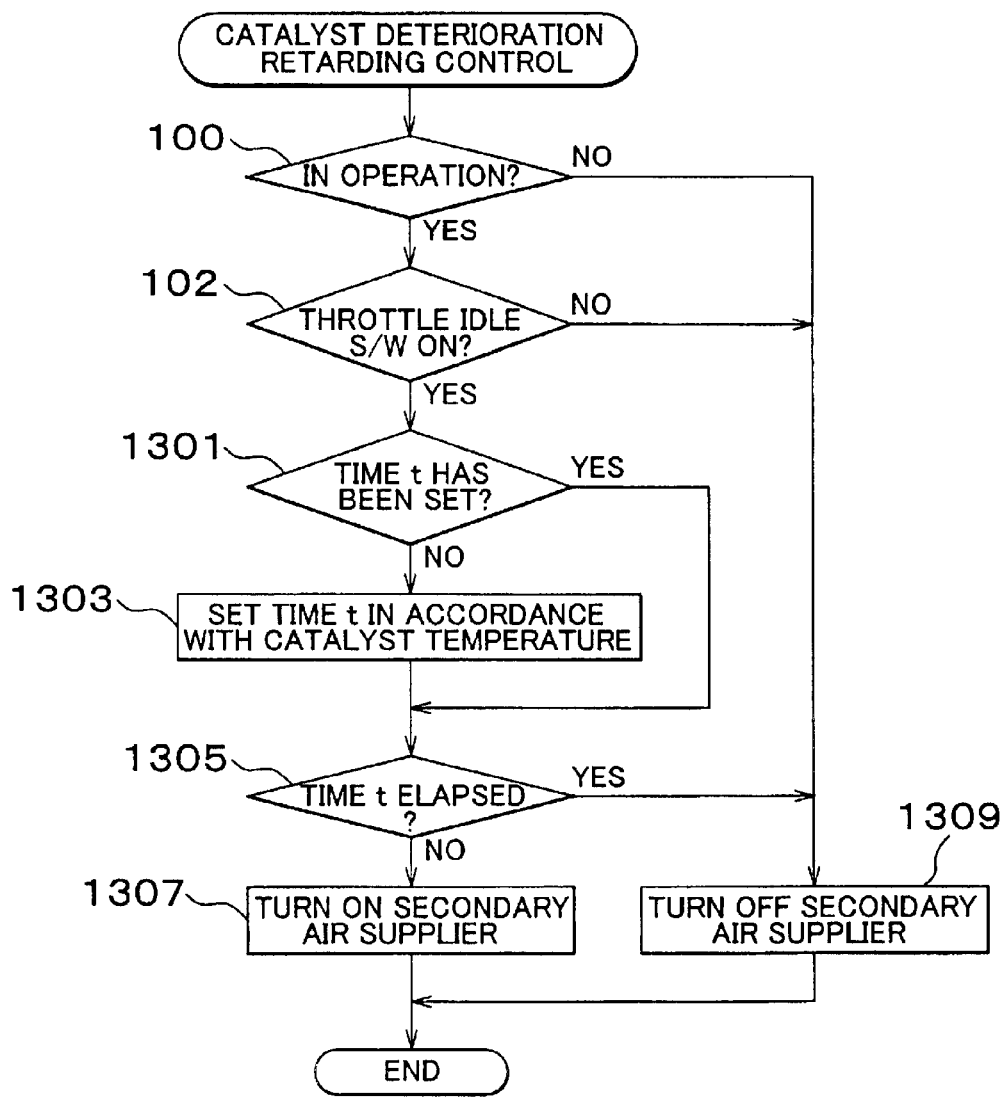
FIG. 12 is a flowchart illustrating a sixth exemplary embodiment of the control method for retarding deterioration of the catalyst in the emission control apparatus shown in FIG. 1.

FIG. 12 is a flowchart illustrating a control method for retarding deterioration of the catalyst in accordance with the exemplary embodiment. The operation of FIG. 12 is carried out by a routine executed by the ECU 15 at predetermined time intervals.

FIG. 12 illustrates an operation of supplying fresh air to the emission control catalyst through the use of the secondary air supplier device 7. In FIG. 12, step numbers identical to those used for the foregoing exemplary embodiments represents processes identical to the processes in the foregoing exemplary embodiments.

In FIG. 12, if it is determined in step 100 that the engine is in operation and it is determined in step 102 that the engine is in a decelerating operation, fresh air is supplied to the emission control catalyst. In this exemplary embodiment, by adjusting the duration of operation of the secondary air supplier device 7 in accordance with the temperature of the emission control catalyst, the total amount of fresh air supplied to the catalyst is adjusted so that the emission control catalyst is cooled to an appropriate temperature range.

In step 1301 in this operation, it is determined whether the duration of operation of the secondary air supplier device has already been computed. If the operation duration has not been computed, the operation proceeds to step 1303. In step 1303, an operation duration t of the secondary air supplier device is determined based on the catalyst temperature detected by the catalyst temperature sensor 10. The duration t is an operation duration of the secondary air supplier device that is needed to supply an amount of fresh air needed to reduce the temperature of the catalyst from the detected temperature of the catalyst to an appropriate temperature range. The operation duration of the secondary air supplier device is determined with reference to results of experiments conducted beforehand using an actual catalyst and an exhaust system.

If it is determined in step 1301 that an operation duration t has been set on the basis of the temperature of the emission control catalyst, the operation proceeds to step 1305 without execution of step 1303. That is, the process of step 1303 of setting an operation duration t on the basis of the temperature of the emission control catalyst is executed only at the beginning of the supply of fresh air.

Until it is determined in step 1305 that the duration t set in step 1303 has elapsed, the secondary air supplier device 7 is operated (step 1307). When the duration t elapses, the secondary air supplier device 7 is stopped (step 1309). The duration set in step 1303 is cleared when the secondary air supplier device 7 is stopped in step 1309.

Step 1309 is executed to stop the secondary air supplier device, not only in the case where either one of the conditions at steps 100 and 102 is unmet, but also in the case where either one of the conditions at steps 100, 102 is not met during the supply of fresh air started after the conditions are both met.

According to this exemplary embodiment, the amount of fresh air supplied to the catalyst is adjusted in accordance with the temperature of the emission control catalyst. Therefore, it becomes possible to reliably reduce the temperature of the emission control catalyst to an appropriate temperature range, and to prevent wasteful power consumption of the secondary air supplier device caused by an excessive supply of fresh air to the catalyst.

Figure 13:
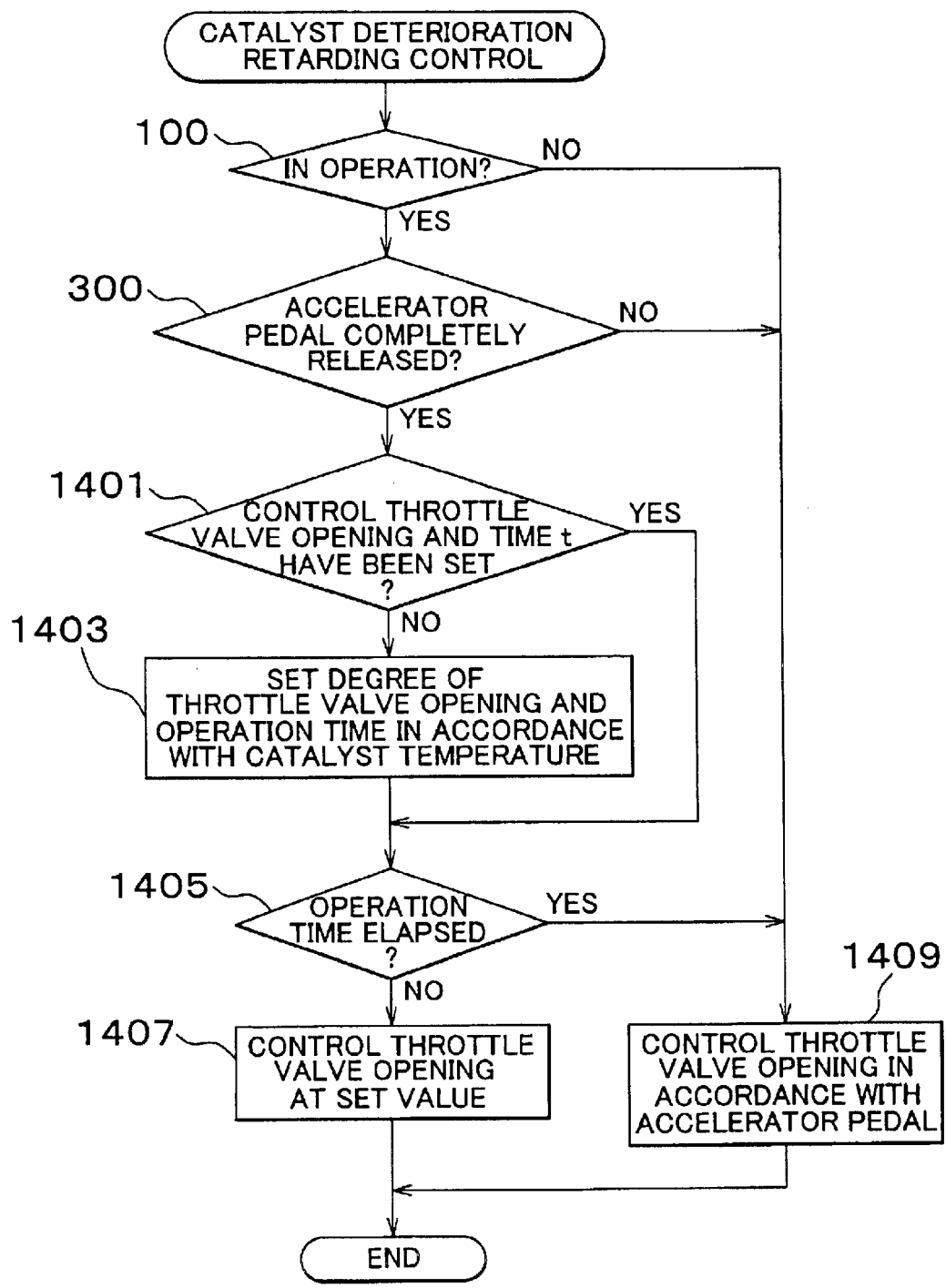
FIG. 13 is a flowchart illustrating a modification of the sixth exemplary embodiment of the control method for retarding deterioration of the catalyst.

FIG. 13 illustrates a modification of the exemplary embodiment in which fresh air that has passed through the combustion chambers is supplied to the emission control catalyst by increasing the degree of throttle opening during a decelerating operation of the engine. The operation illustrated in FIG. 13 is carried out when it is determined in step 300 that the throttle valve is completely closed. This exemplary embodiment differs from the exemplary embodiment illustrated in FIG. 12 in that in step 1403, the time during which an increased degree of throttle valve opening is maintained and the amount of the increase in the degree of throttle valve opening are set on the basis of the temperature of the emission control catalyst. That is, the amount of flow of fresh air supplied to the catalyst via the combustion chambers is determined by the degree of throttle valve opening and the total amount of fresh air supplied to the emission control catalyst is determined by the duration of an increased degree of throttle valve opening. In this exemplary embodiment, the degree of the throttle valve opening is set to provide a predetermined amount of flow on the basis of the engine revolution speed (in this exemplary embodiment, the emission control catalyst is determined by the engine revolution speed detected by the engine revolution sensor 19), and the duration t of an increased degree of throttle valve opening is set in step 1401 to provide an amount of fresh air needed to cool the catalyst to an appropriate temperature range on the basis of the temperature of the emission control catalyst.

In the operation of FIG. 13, similar to the operation of FIG. 12, the degree of throttle valve opening is increased by a set amount of increase in step 1407, and the degree of throttle valve opening is immediately returned to a value (including a value corresponding to the completely closed state) corresponding to the amount of operation of the accelerator pedal in step 1409 when it is determined that the set time, i.e. the duration t elapses in step 1405 or when either one of the conditions at step 100 and 300 becomes unmet.

Figure 14:
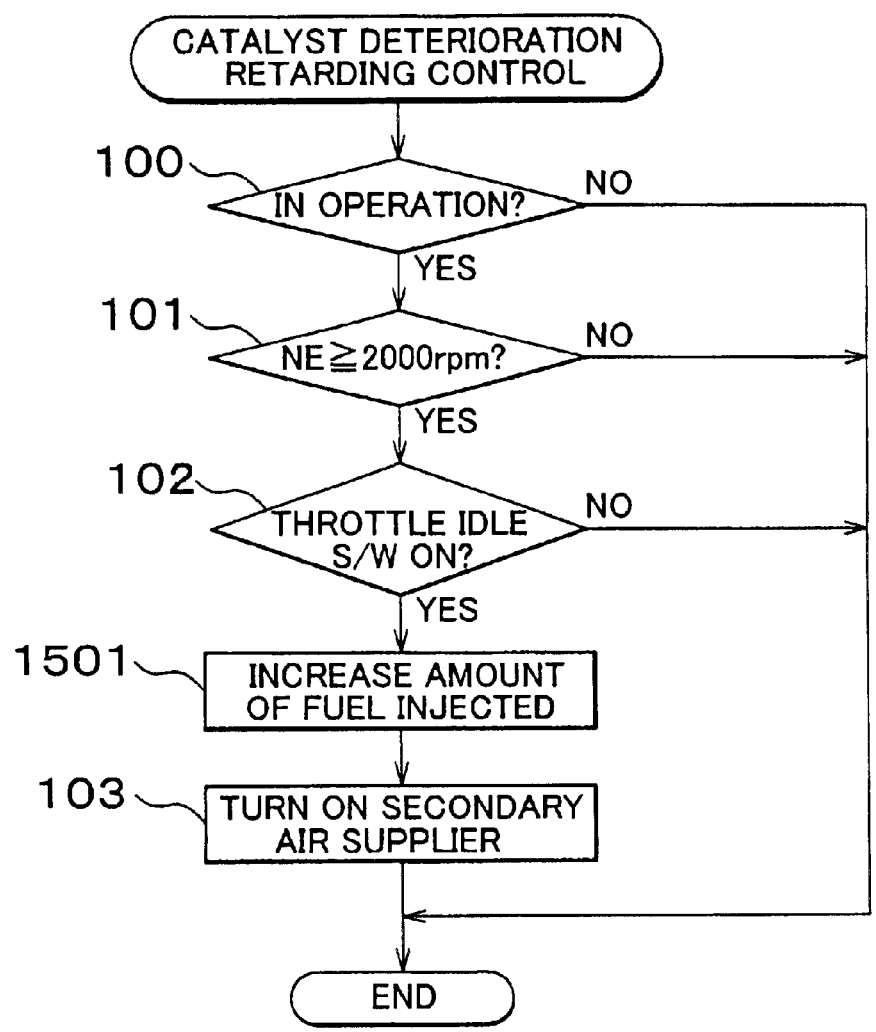
FIG. 14 is a flowchart illustrating an seventh exemplary embodiment of the control method for retarding deterioration of the catalyst in the emission control apparatus shown in FIG. 1.

It should be apparent that in the exemplary embodiments illustrated in FIG. 3 and FIGS. 5 to 11, the amount of fresh air supplied can be set on the basis of the temperature of the emission control catalyst by processes similar to those illustrated in FIG. 12 or 14.

Although in this exemplary embodiment, the temperature of the catalyst is directly detected by using the catalyst temperature sensor 10 provided on the catalyst, the temperature of the catalyst changes in accordance with heat input from exhaust gas and heat release to exhaust gas. Therefore, it is also possible to determine a relationship between the catalyst temperature and the value of parameters indicating the state of engine operation, such as the temperature of exhaust and the amount of flow of exhaust, or the engine revolution speed and the amount of fuel injected, etc. beforehand through experiments or the like, and to estimate the catalyst temperature indirectly based on the state of operation of the engine.

An eighth exemplary embodiment of the invention will next be described. In the foregoing exemplary embodiments, fresh air is supplied to the emission control catalyst during the decelerating operation of the engine. Normally, during the decelerating operation of the engine, the supply of fuel to the engine is reduced or stopped. Therefore, if fresh air is supplied to exhaust during the decelerating operation of the engine, the air-fuel ratio of exhaust that reaches the catalyst may become a lean air-fuel ratio in some cases. At the beginning of the decelerating operation of the engine, the catalyst temperature is not reduced yet. Therefore, if in this state, a lean air-fuel ratio exhaust gas is supplied to the catalyst, the catalyst is exposed to a high-temperature and lean air-fuel ratio atmosphere, thus giving rise to a problem of accelerated deterioration of the catalyst.

In order to prevent this problem in this exemplary embodiment, if air is to be supplied to the emission control catalyst to reduce the catalyst temperature, an amount of fuel that allows the air-fuel ratio of an exhaust gas (mixture of engine exhaust and fresh air) that reaches the catalyst to be kept at the stoichiometric air-fuel ratio or on the fuel rich side is supplied to the engine.

Therefore, exposure of the emission control catalyst to a high-temperature and lean air-fuel ratio atmosphere is avoided, so that deterioration of the catalyst is effectively retarded. The amount of air supplied to the catalyst during the decelerating operation of the engine is substantially constant at a relatively small value if, for example, air is supplied from the secondary air supplier device. If during the decelerating operation of the engine, the degree of throttle valve opening is increased and fresh air that has passed through the combustion chambers is supplied to the emission control catalyst, the amount of increase in the degree of throttle valve opening is relatively small and the amount of fresh air supplied to the emission control catalyst is also set relatively small. Therefore, the amount of fuel needed to keep the exhaust air-fuel ratio at the stoichiometric air-fuel ratio or on the lean side at the time of supply of fresh air becomes relatively small, and the influence on the fuel economy of the engine becomes substantially ignorable. Furthermore, the amount of fuel supplied is relatively small, and the exhaust temperature becomes considerably lower than the exhaust temperature occurring during a normal operation. Hence, the catalyst cooling effect is not greatly affected.

FIG. 14 is a flowchart illustrating a control method for retarding deterioration of the catalyst in this exemplary embodiment, wherein the secondary air supplier device 7 is used to supply fresh air to the emission control catalyst. The operation illustrated in FIG. 14 is carried out by a routine executed by the ECU 15 at predetermined time intervals.

In this exemplary embodiment, when the engine is in operation (step 100) and the engine revolution speed is greater than or equal to a predetermined revolution speed (step 101) and a decelerating operation is performed (step 102), the secondary air supplier device 7 is actuated (step 103) to supply fresh air to the emission control catalyst.

The amount of flow of fresh air supplied from the secondary air supplier device 7 is substantially determined by the pressure loss in the engine exhaust system. Therefore, if the structure of the exhaust system is determined, a substantially fixed amount of flow is provided. Hence, the amount of fuel needed to keep the air-fuel ratio of exhaust that reaches the emission control catalyst at the stoichiometric air-fuel ratio or on the rich air-fuel ratio side during the supply of fresh air becomes substantially fixed. In this exemplary embodiment, the amount of fuel needed to keep the exhaust air-fuel ratio at the stoichiometric air-fuel ratio or on the rich side during the supply of fuel air is determined beforehand. In step 1501, the thus-determined constant amount of fuel is injected into the engine through the injector 17.

Figure 15:
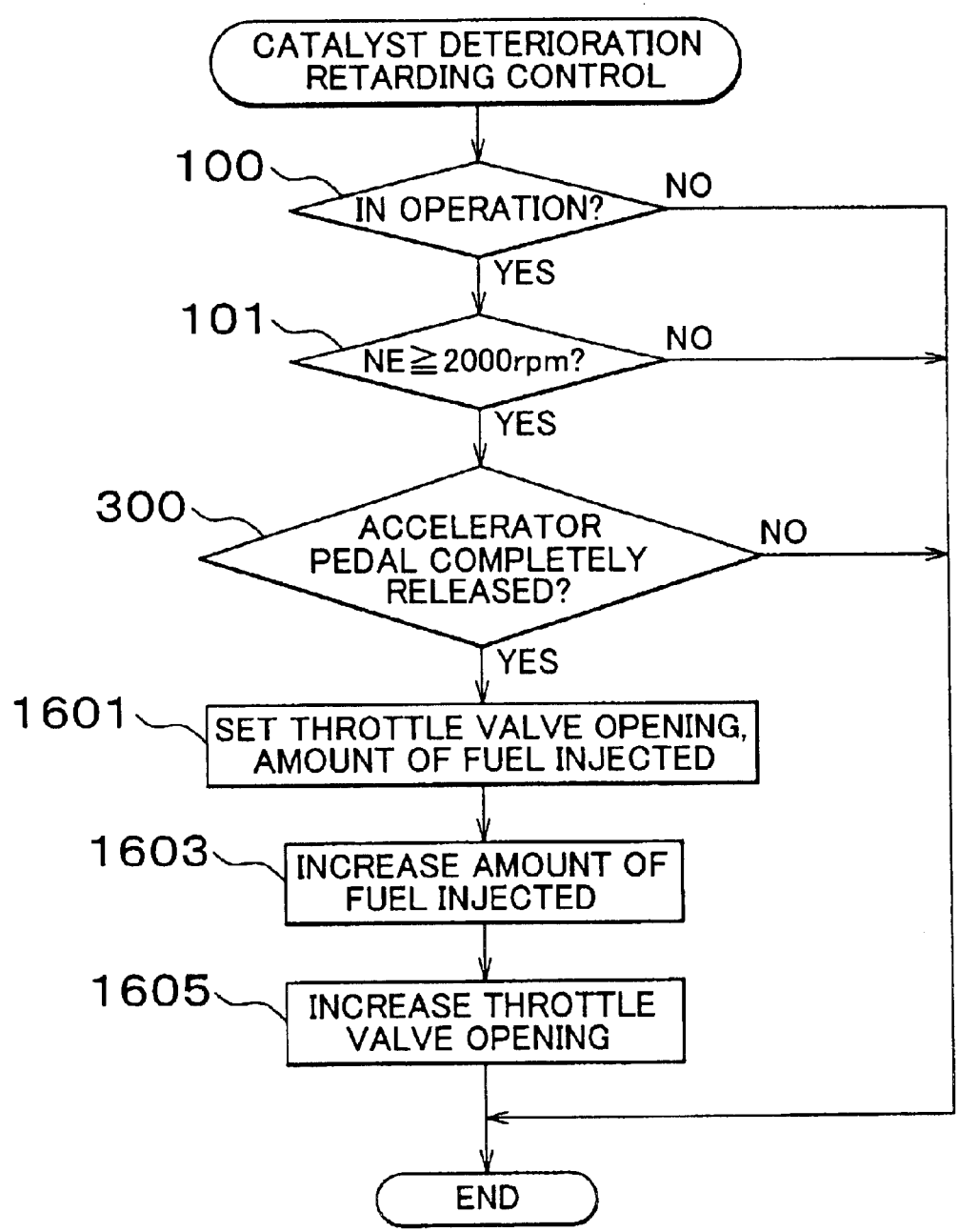
FIG. 15 is a flowchart illustrating a modification of the seventh exemplary embodiment of the control method for retarding deterioration of the catalyst.

FIG. 15 is a flowchart illustrating a control method for retarding deterioration of the catalyst in this exemplary embodiment, wherein during a decelerating operation of the engine, the degree of throttle valve opening is increased to supply fresh air that has passed through the combustion chamber to the emission control catalyst. The operation illustrated in FIG. 15 is also carried out by a routine executed by the ECU 15 at predetermined time intervals.

In the operation of FIG. 15, when the engine is in operation (step 100) and the engine revolution speed is greater than or equal to a predetermined revolution speed (step 101) and the amount of depression of the accelerator pedal is completely closed (step 300), the degree of throttle valve opening is increased to supply air that has passed through the combustion chambers to the emission control catalyst, as in the operation of FIG. 5. In this exemplary embodiment, however, if the aforementioned conditions are met, the degree of throttle valve opening and the amount of fuel injected during the supply of fresh air are set in step 1601. Subsequently in step 1603, the amount of fuel injected into the engine is set to the amount of fuel injection set in step 1601. In step 1605, the throttle valve is adjusted to the degree of throttle valve opening set in step 1601.

The amount of fresh air that passes via the throttle valve sets on the basis of revolution speed. In step 1601 in this exemplary embodiment, the degree of throttle valve opening is set at the degree of opening pre-set on the basis of the engine revolution speed, and the amount of fuel needed to be injected to keep the exhaust air-fuel ratio at a predetermined stoichiometric air-fuel ratio or a rich air-fuel ratio when fresh air is supplied to the emission control catalyst in the amount of flow set by the degree of throttle valve opening is calculated. The amount of fuel needed to be injected amount of fuel is injected into the engine through the injector 17.

As is apparent from the above description, this exemplary embodiment prevents exposure of the emission control catalyst to a high-temperature and lean air-fuel ratio atmosphere during the supply of fresh air as well. Therefore, it becomes possible to quickly reduce the temperature of the emission control catalyst while completely retarding the deterioration of the catalyst.

In this exemplary embodiment, step 300 may be replaced with the above mentioned step 102. Although not described in detail, it is possible to keep the exhaust air-fuel ratio at the stoichiometric air-fuel ratio or a rich air-fuel ratio during the supply of fresh air to effectively retard the deterioration of the emission control catalyst in the exemplary embodiments illustrated in FIG. 3 and FIGS. 5 to 11 and FIGS. 12 and 13 as well by an operation similar to that illustrated in FIG. 14 or 15.

The ECU 15 of the illustrated embodiment is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A method for retarding deterioration of an emission control catalyst of an internal combustion engine, comprising:

determining whether a condition for executing a fuel cut operation of stopping a supply of fuel to the engine occurs during a decelerating operation of the engine;

starting a supply of fresh air to the emission control catalyst if it is determined that the condition for executing the fuel cut operation occurs; and starting the fuel cut operation after the fresh air starts to be supplied.

2. An emission control apparatus of an internal combustion engine, comprising:

an emission control catalyst disposed in an engine exhaust passage;

a supplier device that supplies fresh air to the emission control catalyst; and a controller that controls the supplier device to start supplying the fresh air to the emission control catalyst before a fuel cut operation starts for stopping a supply of fuel to the engine if a condition for executing the fuel cut operation occurs during a decelerating operation of the engine.

3. The emission control apparatus according to claim 1, wherein the controller controls the supplier device to supply the fresh air to the emission control catalyst if the temperature of the emission control catalyst is higher than a predetermined temperature and an air-fuel ratio is a lean air-fuel ratio.

4. The emission control apparatus according to claim 1, wherein the supplier device supplies a secondary air that has not passed through a combustion chamber of the engine as the fresh air to the emission control catalyst.

5. The emission control apparatus according to claim 1, further comprising a fuel injection device that supplies fuel to the engine, wherein the controller controls the fuel injection device to supply the engine with an amount of the fuel that allows an air-fuel ratio of an exhaust that reaches the emission control catalyst to be kept at one of a stoichiometric air-fuel ratio and a rich air-fuel ratio during execution of the fuel cut operation.

6. The emission control apparatus according to claim 1, wherein when the fresh air is supplied to the emission control catalyst, the controller sets an amount of the fresh air supplied to the emission control catalyst on the basis of the temperature of the emission control catalyst.

7. The emission control apparatus according to claim 1, wherein the supplier device has, in an engine intake passage, a throttle valve whose degree of opening is variable independently of an amount of depression of an accelerator pedal, and during the decelerating operation of the engine, the controller increases the degree of opening of the throttle valve to supply an air that has passed through a combustion chamber as the fresh air to the emission control catalyst.

8. The emission control apparatus according to claim 7, wherein the controller, when increasing the degree of opening of the throttle valve during the decelerating operation of the engine, controls a brake to increase a braking force of the brake even if an amount of depression of a brake pedal does not increase.

* * * * *